June 15, 1943.  R. R. POLLOCK  2,321,936
TIRE SHOE BUFFING MACHINE AND THE LIKE
Filed April 11, 1941  4 Sheets-Sheet 1
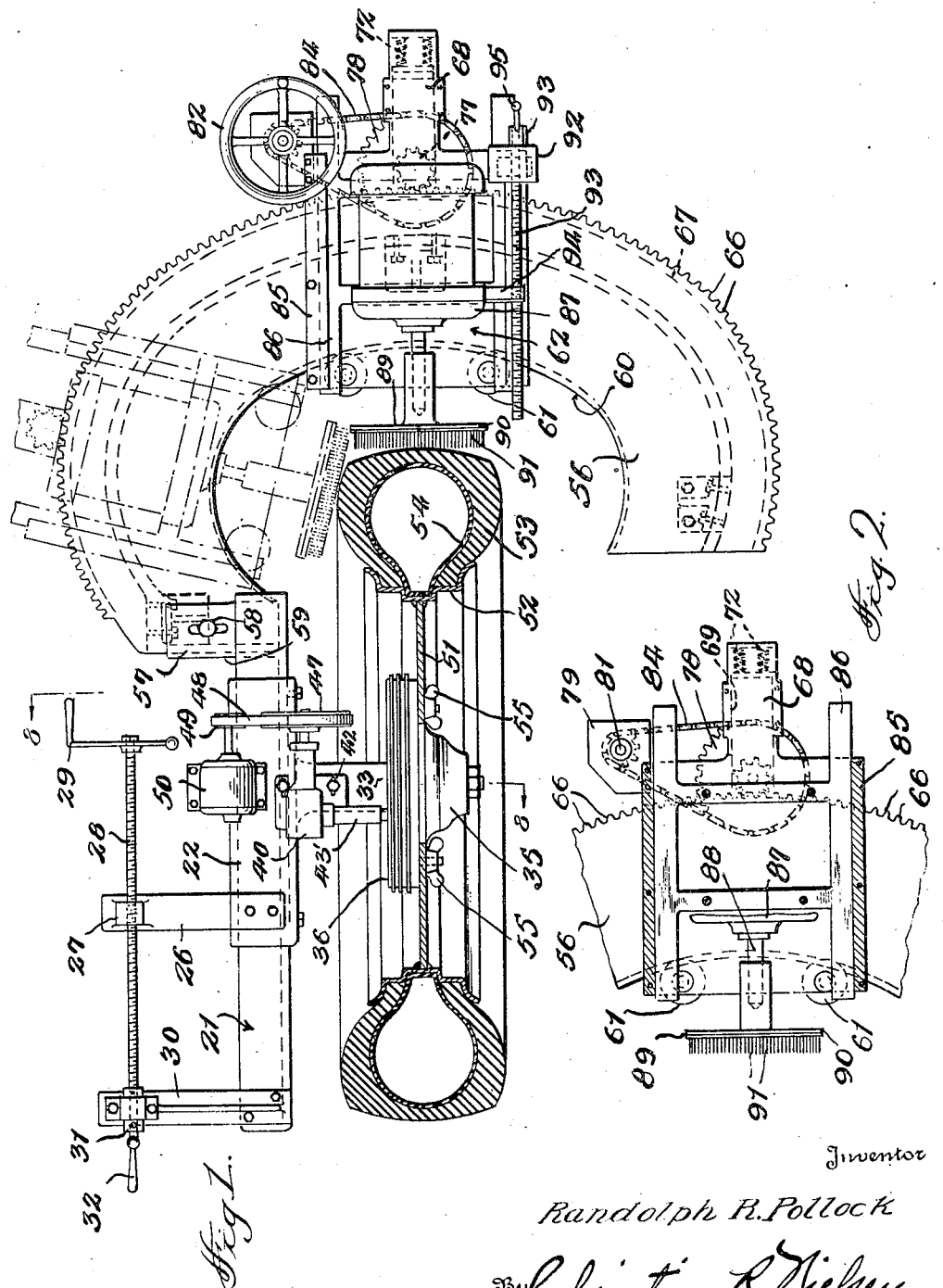
Inventor
Randolph R. Pollock
By Christian R. Nielsen
Attorney

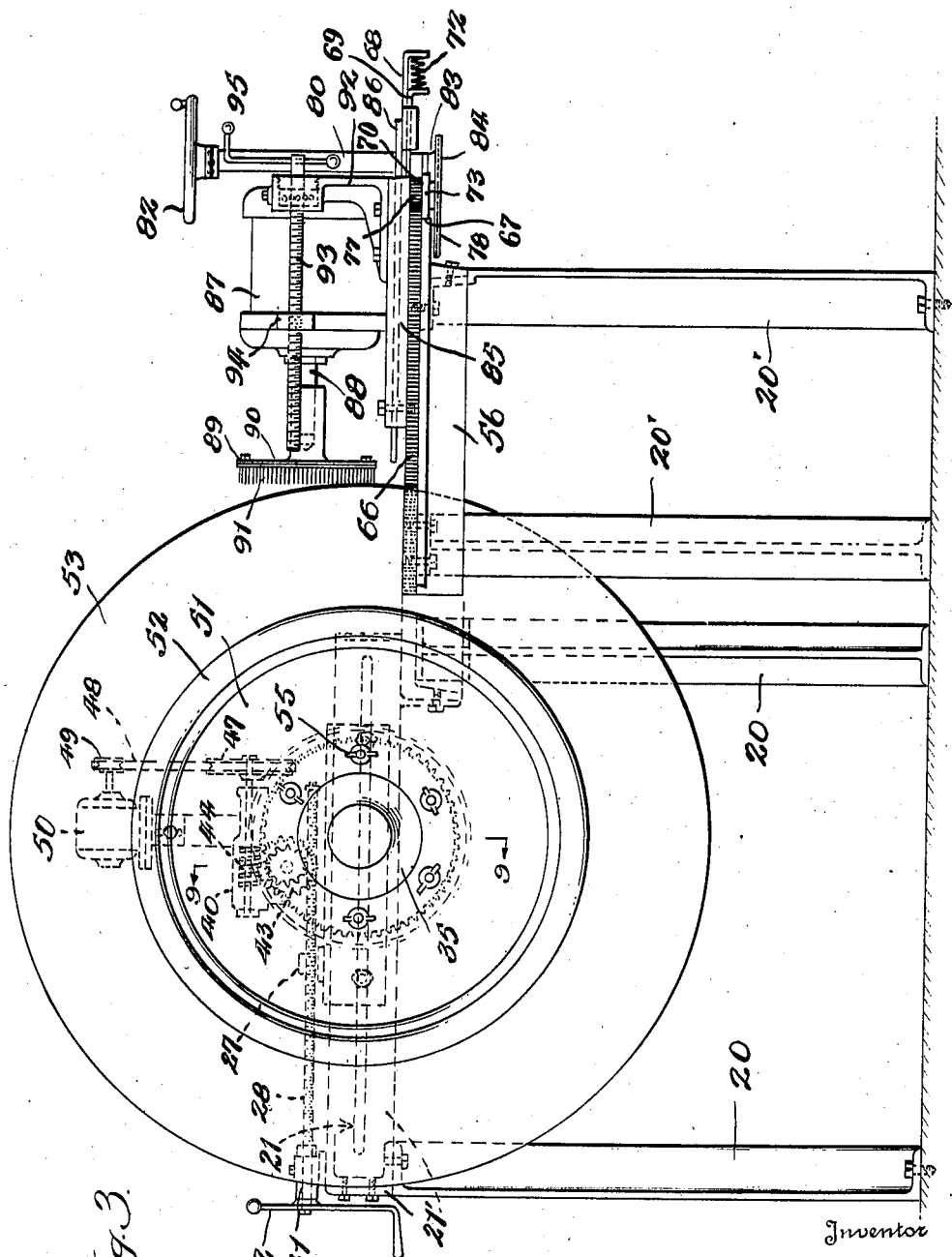

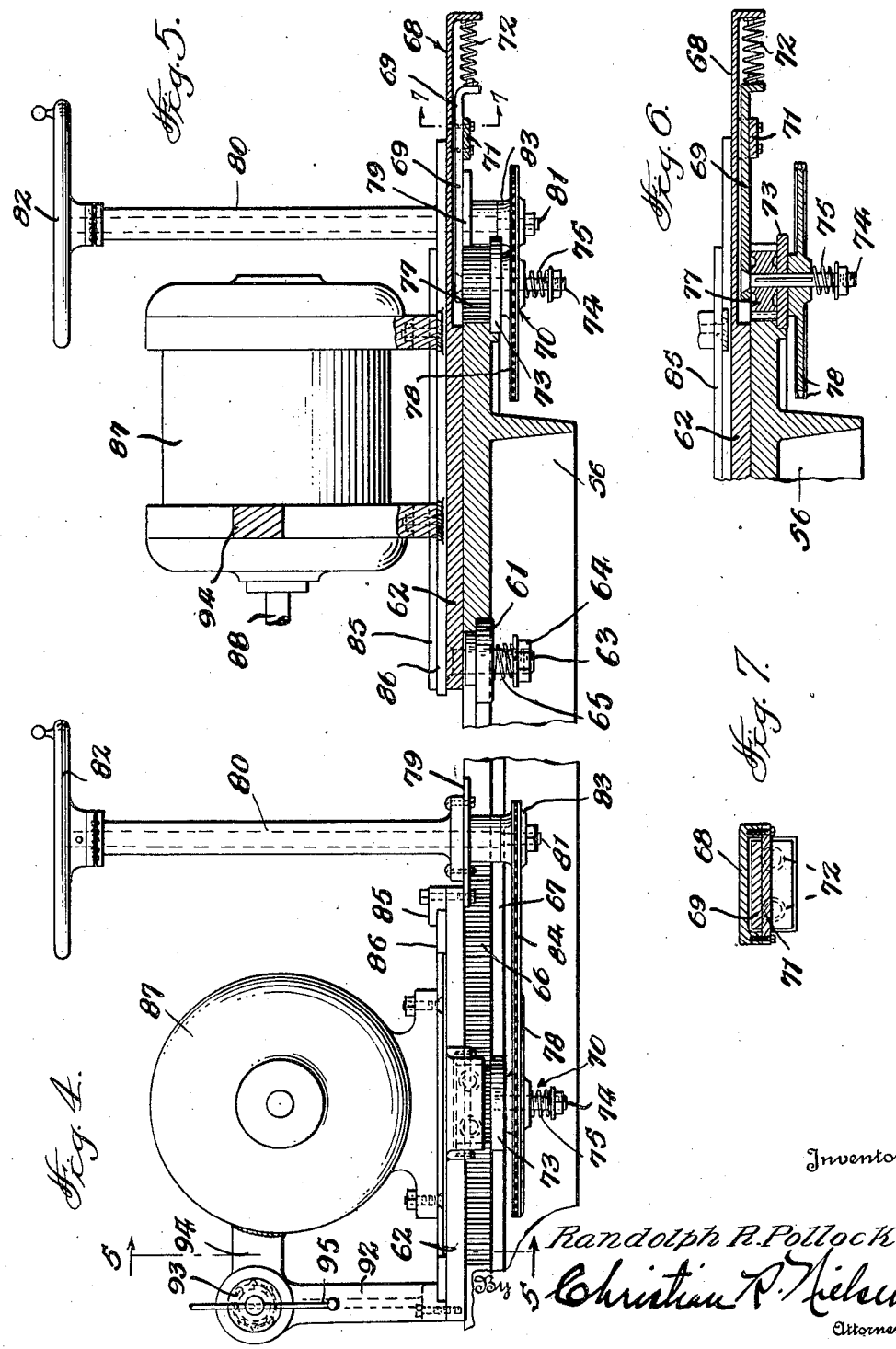

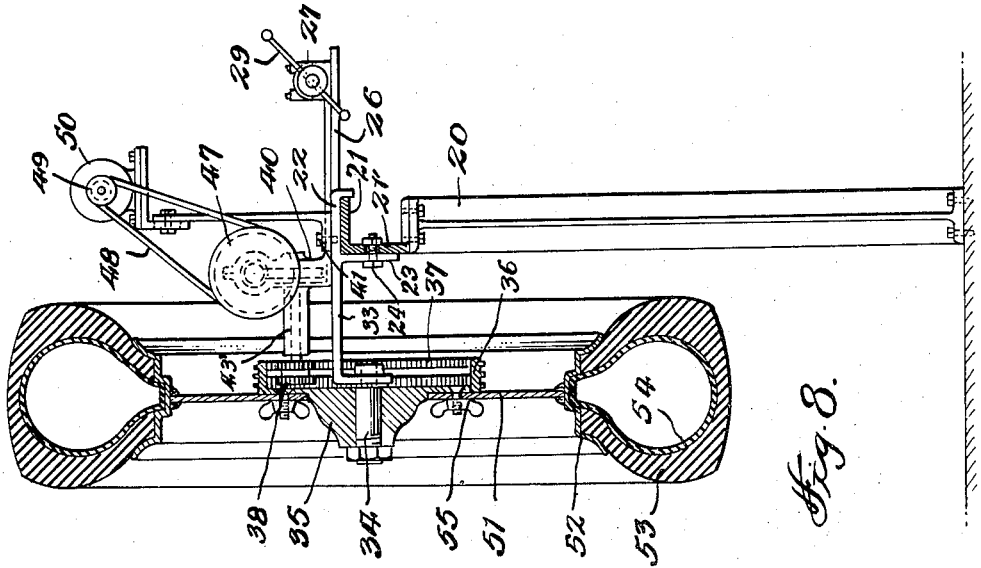
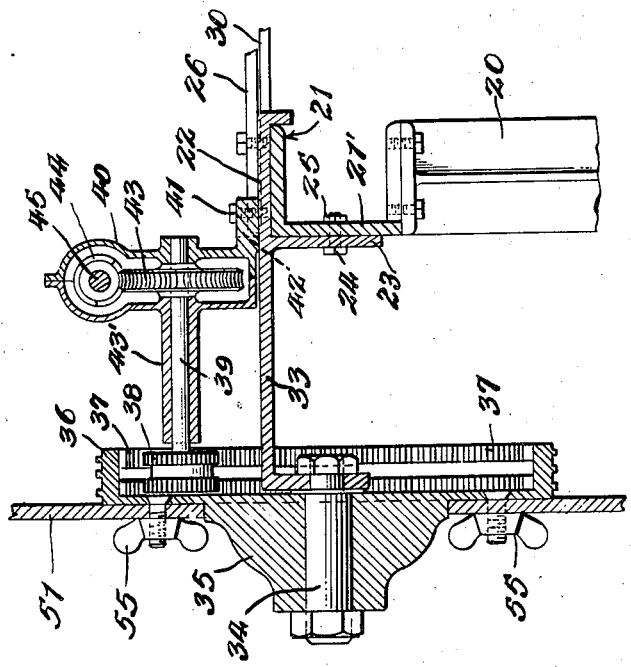

Patented June 15, 1943

2,321,936

UNITED STATES PATENT OFFICE 2,321,936

TIRE SHOE BUFFING MACHINE AND THE LIKE

Randolph R. Pollock, Lawrenceburg, Tenn.

Application April 11, 1941, Serial No. 388,172

5 Claims. (Cl. 29—76)

It is an object of the present invention to effect improvements in tire buffing machines, and particularly machines of the general character illustrated in my co-pending application Ser. No. 356,382, filed September 11, 1940, now Patent No. 2,294,047 of Aug. 25, 1942, and it has in view the attainments of many of the objects stated in said prior application, and others in addition.

An important aim of the invention is to present such a machine which will operate to abrade and dress the carcass of a tire shoe on the tread portion, so as to form with great accuracy a new roughened surface thereon adapted to receive and have secured thereto with the utmost effectiveness a top cap, crown or tread, as will be understood. A further aim is to present a machine so constructed as to avoid any possibility of unsymmetrical contours in the resurfaced tire, both with respect to the major circumferential dimensions thereof, as well as to the transverse contour. It is also an aim to present such a machine as will enable the use of my disk tack wheel in such manner as to increase the speed and efficiency of removal of rubber from a tire shoe, with a minimum liability of heating of the tire to an objectionable degree.

One of the most important aims of the invention is to enable the complete resurfacing of a tire shoe with great rapidity, while at the same time insuring the effectiveness of the operation with respect to symmetry of the finished work.

A further important aim is to present a machine having the above advantages which will be of an extremely rugged and durable character, while at the same time being adapted to accommodate all tire sizes, from the smallest motor cycle tire to the largest tractor tire. A further important aim in this connection is to present such a machine which will, at the same time, be comparatively small and compact, and quickly adjustable to the various tire sizes.

A still further important aim of the invention is to present such a machine which may be utilized to produce any desired tire contour, on any tire, by extremely simple adjustment of the machine, without requiring modification of manufacture of the machine.

A further important aim of the invention is to present such a machine which will effect the adjusting of the tire with a minimum liability of variation from adjustments to which it may be set, and which will operate with a minimum of irregularity, chatter and shimmy. It is also an aim to present a machine with the above advantages which will also be adapted to operate for the complete treatment of the peripheral surface of a tire from one side to the other, through any extremes which may be required, including the removal of both shoulders, in one setting of the device, and as a single continuous operation.

A further important aim is to present such a device which will be readily understood by the average workman versed in the tire repair art, and which may be manipulated and operated by such person rapidly and efficiently with a minimum risk of injury, either to persons or work.

Additional objects, advantages and features of invention reside in the construction, arrangement and combination of parts, involved in the embodiment of the invention, as will be readily understood from the following description and accompanying drawings, wherein Figure 1 is a top view of a machine embodying the invention, with a tire in course of dressing, the tire and its mounting being shown in horizontal section.

Figure 2 is a detail of the tack wheel or buffer unit, with the motor removed.

Figure 3 is a side elevation of the machine.

Figure 4 is a fragmentary side elevation showing the buffer carriage and its operating means taken from the right of Figure 1.

Figure 5 is a vertical sectional view on the line 5—5 of Figure 4, looking in the direction of the arrow.

Figure 6 is a detail section of the carriage operating gear and its mounting.

Figure 7 is a fragmentary cross section, on the line 7—7 of Figure 5.

Figure 8 is a cross section on the line 8—8 of Figure 1.

Figure 9 is a vertical section on the line 9—9 of Figure 3.

There is illustrated a machine comprising a framing having two standards 20, supporting a bed or rail 21, upon which there is slidably engaged a carriage 22. The rail 21 is horizontal and rectilinear, and the carriage is suitably flanged to rest upon and engage each side of the rail to hold the carriage firmly in alinement with the rail at all times. The rail includes a vertical web portion 21' horizontally slotted for the major portion of the length of the rail, and the carriage includes a depending flange 23 set close beside the web portion and having securing bolts 24 engaged therethrough and through the slot of the rail 21, and secured by binding nuts 25, by which the carriage may be secured at adjusted positions on the rail 21. A bracket 26 is mounted on the carriage, projecting from the outer side of the machine, and having an interiorly threaded bearing 27 at its outer end, in which there is engaged a screw shaft 28, having a crank handle 29 at its inner end, the shaft extending horizontally and parallel to the rail 21 and being swivelled in a bracket 30 at the outer end of the rail 21. An operating handle 31 is also provided on the end of the shaft immediately outward of the swivelled bearing, so that the shaft may be rotated manually at either end with facility. By this means, the carriage 22 is moved longitudinally on the rail 21, as will be apparent. Projected from the body of the carriage and at the side opposite the bracket 26, and at an intermediate position on the carriage, there is a bracket arm 33, on which there is mounted a stud shaft 34, projected longitudinally from the arm 33, this shaft having revolubly mounted thereon a hub element 35, which may be removable from the shaft 34 in the usual manner. The hub 35 is formed with a concentric flange 36 extended therefrom concentric with the shaft 34 and at the side next to the arm 33, this flange having an internal gear 37 therein, with which there is meshed a pinion 38 mounted on a shaft 39 which is revolubly mounted across a gear housing 40, fixed on the carriage 22 by means of two bolts 41, engaged in slots 42 parallel to each other and to the plane of the gear 37, these slots being formed in a foot piece of the housing 40 which is set upon the carriage 22. The mounting of the gear case 40 as described permits horizontal adjustment of the case 40 with the pinion 38 so as to move the latter horizontally toward or away from the near part of the gear 37. The case 40 is formed with an elongated journal 43' at the side next to the flange 36 for the shaft 39, so that an entirely adequate bearing is provided when required. In the casing 40, fixed on the shaft 39 there is a worm gear 43 engaged by a worm 44 carried upon a shaft 45 which extends inwardly parallel to the rail 22 and having fixed on its extremity without the casing 40 a pulley 47 with which the belt 48 is engaged, the belt being also engaged around a smaller pulley 49 fixed on the shaft of an electric motor 50 of conventional form and function, by which proper power may be supplied for rotating the hub 35, as may be required.

Removably mounted on the hub 35 in accordance with conventional practice in the mounting of automobile wheels, there is a wheel 51 having a rim 52 on which an automobile tire shoe is adapted to be mounted in the same manner as such a tire would be mounted upon an automobile wheel, and upon the rim there is shown mounted a tire shoe 53, with the usual inflated pneumatic tube 54 therewithin. In the present instance, the mounting of the wheel is accomplished by means of threaded studs and wing nuts, as at 55. It will be seen that by utilizing the motor 50, the tire may be rotated, and the drive from the motor involving great speed reduction, the wheel will be slowly rotated when the motor turns.

At a level somewhat below the axis of the wheel, a table element 56 is mounted on additional standards 20', this table being substantially in the shape of the letter C in plan, as shown in Figure 1. It is fixed in a horizontal plane and connected adjustably to the rail 21, so that the rail and table may be fixed in relation to each other as desired. This connection, in the present instance, comprises a bracket plate 57 extended laterally from the rail at a proper level, and bolted to the top of the table 56 as at 58, the bolts being engaged through a slot 59 at right angles to the rail 21, so that the table may be adjusted transversely to the plane of the wheel 51 by loosening the bolt and adjusting the end of the table with respect to the bracket 57. The bracket is formed with a flange 59 in a vertical plane at right angles to the rail 21, and the end of the table 56 is finished to fit snugly and slidably against the flange 58 so that the table will be securely held against disturbance of its adjusted positions with respect to the rail. This end of the table is somewhat extended, so that it projects beyond a symmetrical duplication of the opposite side of the table. The table in the present instance is shown as having a planiform top surface, although this may be modified if desired, and is formed with a track edge 60 at the inner side, rabbeted at the lower part to receive a plurality of guide rollers 61 carried upon a carriage plate 62 which is set flat upon the top of the table, extending beyond the outer edge of the table and having guide devices opposed to the rollers 61, engaging the outer edge of the table. In the present instance, the rollers 61 are rabbeted to conform to the rabbets in the inner edge of the table, and are mounted upon studs 63 fixed in the plate 62, nuts 64 being engaged upon the outer parts of the studs which are projected some distance below the rollers 61, and springs 65 being confined between the nuts and the rollers so that the latter press snugly against the under side of the rabbet in the table, while the roller 61 is still spaced slightly from the plate 62, shown in Figure 5. At the outer edge of the table it is formed with a gear rack face 66 at its upper edge part, and is rabbeted thereunder to afford a smooth track surface, as at 67, below the rack. In the present instance, there are two of the rollers 61 mounted at the inner edge of the table on the carriage plate, and opposed to these there is a single guide roller and gear device 70 by which the carriage plate is moved upon the table, and also maintained in a definite relation to the medial line on the table midway between the inner and outer edges. This unit 70, in the present instance, is mounted in a bracket arm 68 extended outwardly from the table, and channelled on its under side; an elongated plate 69 is slidable in the channel of the bracket, and retained therein by a cross piece 71. The plate 69 extends outwardly of the cross piece at all times, and a spring 72 is confined between the outer end of the channel and the plate 69, whereby the plate is held yieldingly at the inner limit of its movement. This limit varies, and is determined by a disc roller 73, mounted on a stud 74, fixed at the inner end of the sliding plate 69, the disc being pressed against the upper face of the rabbet 67 by a spring 75 seated against a nut 76 on the end of the stud 74. A gear 77 is revoluble on the stud 74. A gear 77 is revoluble on the stud 74 above the roller 73, and below the roller a sprocket 78 is engaged revolubly on the stud, the sprocket, the disc and the roller being keyed together in any suitable way. The spring 75 bears directly upon the sprocket, so that the roller is pressed upwardly properly. The gear may be of such thickness as not to interfere with the pressure of the roller against the rabbet of the table, as will be understood. By this mounting, the carriage plate 62 may be moved slidingly from one end of the table to the other, and as the need for accommodation of the roller 74 in its spaced relation to the rollers 61, it may move outwardly against the action of the spring 72.

Projected laterally from the carriage plate at one side, there is a bracket 79, having an upstanding bearing tube 80, in which there is revolubly mounted a shaft 81 carrying an operating wheel 82 at its upper end and a small sprocket 83 at the lower end alined with the sprocket 78. A chain 84 is engaged around the sprockets 83 and 78, so that by operating the wheel 82 the carriage plate may be moved along the table in either direction.

The carriage plate 62 is formed with channel rails 85 at each side, and between these and upon the plate 62 there is snugly slidable a motor-carrying frame 86, upon which a main motor 87 is mounted in any approved manner. The motor shaft 88 is projected from the motor inwardly of the frame 86, and has mounted thereon an abrasive disc 89, in a plane at right angles to the axis of the shaft, this abrasive device being of the kind usually called a tack-wheel. It consists of a planiform head 90 from the outer face of which there are projected a multiplicity of pins or spines 91 formed of steel and mounted in accordance with usual practice in such devices.

The motor is mounted at such height on the frame 86 that the axis of the abrasive device 89 is a short distance above the axis of the wheel 61.

A bracket 92 is erected on the carriage plate 62 at the side opposite the bracket 79, and swivelled in this bracket there is a screw shaft 93, having threaded engagement through a lateral arm 94 projected from the motor, so that upon rotation of the screw the motor will be caused to move longitudinally between the channel rails 85, according to the direction in which the screw is turned. The screw is manually operated by means of a hand crank 95 fixed suitably thereon.

The table 56 is in the shape of a segment of an oval constituting one of the sides and the ends of the oval, the side of the oval being arranged with the minor axis of the oval approximately coincident with the plane of the wheel 51, while the major axis of the oval is arranged at right angles to the plane of the wheel.

In the use of the machine, it may be seen in Figure 1, that movement of the carriage plate 62 along the middle part of the table will cause the tack-wheel to move in an arc suitable for shaping the tread of a shoe to receive the usual cap which is cemented and vulcanized upon the shoe in the operation of re-treading, and with the radius of this arc may be accommodated to various sizes of tires by moving the motor inward or outward, the wheel 51 being also movable with the carriage 22 to bring the periphery of any tire into proper relation with the tack-wheel after such adjustment. Tires of the same size as to tire diameter, but of various wheel sizes, may all be positioned in the same relation to the table 56 and tack-wheel by proper adjustment of the carriage 22 to accommodate wheels of various diameters. Thus, wheels 51 of the various sizes corresponding to those of standard sizes in automobile wheels are kept at hand, and the corresponding tires mounted upon the rims thereof and the wheel secured upon the hub 35 by the fastening 55, as required. For a wheel of large diameter, the carriage 22 is moved outwardly away from the table 56, and for small tires is moved into closer proximity. For tires of different transverse diameter, but for wheels of the same diameter, adjustment is effected by moving the carriage 22, and also the motor slide frame 86. Thus, in the case of a large tire for a given size wheel, the adjustment might be approximately as shown in Figure 1, but for a smaller diameter of tire for the same wheel, it will be necessary to move the carriage 22 outward, and to move the motor and tack-wheel inward, so that in the movement of the carriage plate upon the table, the tack wheel would describe an arc of shorter radius, which would be accommodated to the smaller tire.

In the dressing of tires for retreading, it is customary to form the tread portion upon an arc of comparatively long radius, as indicated in Figure 1, and to then abruptly curve the surface and to dress the sides of the tire on curves of shorter radius intersecting the longer curve of the tread face so as to produce a more or less sharp shoulder at the junction, although in practice, this junction is rounded, so that no actual angle is formed.

In the use of the machine, where a given size of tire is to be treated, it is mounted upon the appropriate wheel 51, and the wheel secured upon the hub 35 as shown. The screw 28 is then operated by the crank 29, or the crank 32, to position the tire in relation to the table approximately as shown in Figure 1, or, a little more distant from the table at the beginning of the dressing operation, and as rubber is removed in the dressing operation, the screw 28 may be further operated to bring the tire into proper final position. The shaft 93 is operated first, to bring the tack-wheel 89 into proper position for the final shaping of the tire, in the first adjustment of the device, and to make sure that operatives attain the proper shaping of the various tires, the positions of the tack-wheel for producing these shapes can be calibrated by appropriate scale markings on the channel rails 85 or other parts of the carriage element, and by mounting a pointer on the motor frame properly coordinated with the scale, to indicate the proper position of the tack-wheel for various sizes of tires, with respect to the transverse diameters of the tires. A similar calibration of the movement of the carriage 22 on the rail 21 may also be carried out, if desired, but owing to the fact that it is a practice to remove only sufficient rubber to give the desired transverse form to the tread, and as some tires are worn more than others before retreading, there will be some variation in the positioning of the carriage 22, and after setting of the motor and tack wheel in position as stated, the operator will only be required to adjust the carriage 22 until a proper tread surface shows thereon.

After adjustment of the motor and tack-wheel position, the tire being properly mounted and the carriage 22 having been operated to bring the tire into position just short of engagement with the tack-wheel, appropriate electrical connections are made with the motor 87 so that the tack-wheel 89 rotates constantly, and connections are made with the motor 50 so that the latter will rotate the tire on the axis of the hub. The carriage plate 62 is then adjusted by means of the wheel 82 at one side or end of the table, and the crank 29 operated to move the carriage 22 further inward until the tire engages the tack-wheel. With the wheel rotating in this position of initial contact, the machine is allowed to operate without disturbance until the wheel has made one complete rotation, after which the wheel 82 is operated to move the motor and carriage along the table toward an opposite position, this movement being effected slowly so that a complete removal of excess tread rubber is effected as the tack-wheel is moved toward the opposite side of the tire. Upon completion of movement of the tack-wheel to the desired limit upon the table, if the necessary smooth tread surface has been produced, without pattern of the original antiskid tread of the tire or other mold parts, the dressing of the tire may be complete. However, if there are deeper mold marks involved in the rubber of the tread of the tire, and it is necessary to remove still more of the excess rubber, the screw 28 is operated by the crank 29 to draw the wheel 51 still closer to the tack-wheel, the two motors being continued in operation, and the motor carriage 62 then being moved gradually again along the table as the rubber is removed from one part of the tire, so that the tack wheel will engage other high parts of the tire rubber. The motor carriage may be moved back and forth upon the table as a final operation, to make sure that all parts of the tire have been uniformly trimmed, and a good, symmetrical surface produced.

In the retreading trade, two principal forms of treads are applied, which are in the form of endless bands of rubber with a good tread pattern, which are adapted to be set over the old tire after dressing, so as to fit snugly therearound, this new tread being then vulcanized in place. One form of such new tread is termed a "top cap" and is comparatively flat in cross section, adapted to fit upon the extreme outer tread surface just to the form approximately shown in Figure 1. For the production of this form of tread, movement of the motor and its carriage is required only in the outer side portion of the table, and if desired, stops may be provided upon the table to limit the movement of the motor carriage properly for such an operation. Another form of tread, however, is known as "camel back cap," and this form of tread includes portions which extend much further around on the sides of the old tire when applied, and to receive such a cap it is necessary to dress the sides of the tire, removing any tread patterns that may remain on the sides, and for effecting this further treatment it is necessary to move the motor on its carriage along the end portions of the table, substantially as dotted in Figure 1, so that the side surfaces of the shoe 53 will be dressed as well as the extreme peripheral or tread portion of the shoe. Stops may be provided additionally at these more extreme positions of the motor and motor carriage, as found desirable, in order that a uniform dressing of the tire will be effected without requiring expert handling or detailed attention by the operator, thus removing the liability of error or damage through mistake of judgment or by carelessness of the operator.

Upon completion of the proper dressing of the tire, the carriage 22 is drawn backwardly, so as to remove the tire shoe from proximity to the tack-wheel, after which the fastenings 55 are operated and the wheel and shoe removed from the machine. The shoe may be retained upon the wheel 51 during the subsequent vulcanizing operation, if desired, and any additional shoes to be dressed may be mounted upon other wheels and put in position upon the machine as before described, and the dressing operation carried out.

It will thus be seen that need for special skill on part of the operator is reduced to a minimum, and that dressing of tires may be effected with great certainty as to symmetrical form and uniformity of appearance of the job with great rapidity and effectiveness. One of the most important attainments of the invention is the elimination of liability of irregularities of contour in the major circumference of the tire, involving irregularity in weight, which would result in shimmy in many cases when the tire is put in use, and there is also attained great certainty in removal of rubber without liability of gouging or uneven cutting, or chatter of the dressing machine or other vibrations tending to effect the quality of the job.

As may be seen in Figure 3, the periphery of the tire when adjusted in engagement with the tack wheel engages only the lower part of the tack-wheel, it being undesirable for the central portion of the tack-wheel to mainly engage the tire, due to difference in abrasive action at the center and adjacent the periphery of the tack-wheel. The tire is preferably rotated in a clockwise direction, as viewed in Figure 3, so that the tire moves downwardly adjacent the tack-wheel. The motor driving the tack-wheel is rotated in one direction, for treatment of one-half the tire and reversed for treatment of the other half of the direction, which may be accomplished by any suitable switch, not shown.

The preferred embodiment of the invention has been described with great particularity, but it will be understood that many changes in construction, arrangement and proportion, and combination of parts may be made, as well as substitution of materials and equivalents mechanically, without departing from the spirit of the invention, as more particularly set forth in the appended claims.

1. A machine of the character described comprising a substantially C-shaped guide presenting an opening upon one side, a carriage slidable upon the guide, an abrasive device mounted upon the carriage and slidable thereon transversely of the path of movement of the carriage upon said guide, means to move the carriage on the guide, means to fix the abrasive device at adjusted positions on the carriage, a tire mounting consisting of a rectilinear guide arranged parallel to a symmetrical axis of the C-shaped guide, a revoluble wheel mounted thereon in a plane coincident with said symmetrical axis, means to rotate the wheel, and means to move said mounting from said rectilinear guide to present the wheel through the opening of the C-shaped guide, for the purpose described.

2. The structure of claim 1, in which said C-shaped guide includes an inner rail portion, said carriage having guide-wheels to travel said rail portion, and an outer rail portion parallel to the first, and guide roller means on the carriage to engage the outer rail portion, and a rack at the outer edge of said C-shaped guide, a gear revolubly mounted on the carriage in mesh with the rack, and means to rotate the gear, for the purposes described.

3. A rotary tire mounting device, means to operate the same, on a fixed axis, a substantially C-shaped guide presenting an opening upon one side and arranged in a plane close to the axis of the tire, and including inner and outer guide elements, a carriage device supported thereon and having guide wheels engaging the respective guide elements, a rack on said C-shaped guide parallel to said guide elements, a gear revolubly mounted on the carriage meshed with the rack, manual means to operate the gear, guide means on the carriage transverse to its path of movement on the first named guide means, a rotary motor mounted slidably in the second named guide and having a shaft projected toward the tire mounting, means to secure the motor in adjusted positions in the second-named guide, and an abrasive head on said motor shaft in position to engage a tire upon said tire mounting.

4. The structure of claim 3, in which said gear of said carriage includes a slidable mounting on the carriage, for movement of the gear translatively in a path normal to the adjacent portion of said rack, and including a spring loading means by which said gear is pressed yieldingly against the rack.

5. A tire dressing machine comprising a substantially C-shaped guide presenting an opening upon one side, the C-shaped guide having inner and outer guide elements and a rack parallel to the guide elements, a carriage on the C-shaped guide having guide wheels engaging respective guide elements, a gear on the carriage in mesh with the rack, the gear including a yieldable mounting normally urging the gear into meshed engagement with the rack, means for rotating the gear for moving the carriage along the C-shaped guide, guide means on the carriage transverse to its path of movement on the C-shaped guide, a rotary motor slidably mounted on the guide means and having a shaft and an abrasive head, means for securing the motor in adjusted positions, and a rotary tire mounting device adjustably positioned within the open end of the C-shaped guide for presentation of a tire for operating engagement with the abrasive head

RANDOLPH R. POLLOCK.